March 15, 1938.  B. H. MORTUS  2,111,295
NUT TAPPING MACHINE
Filed April 25, 1936
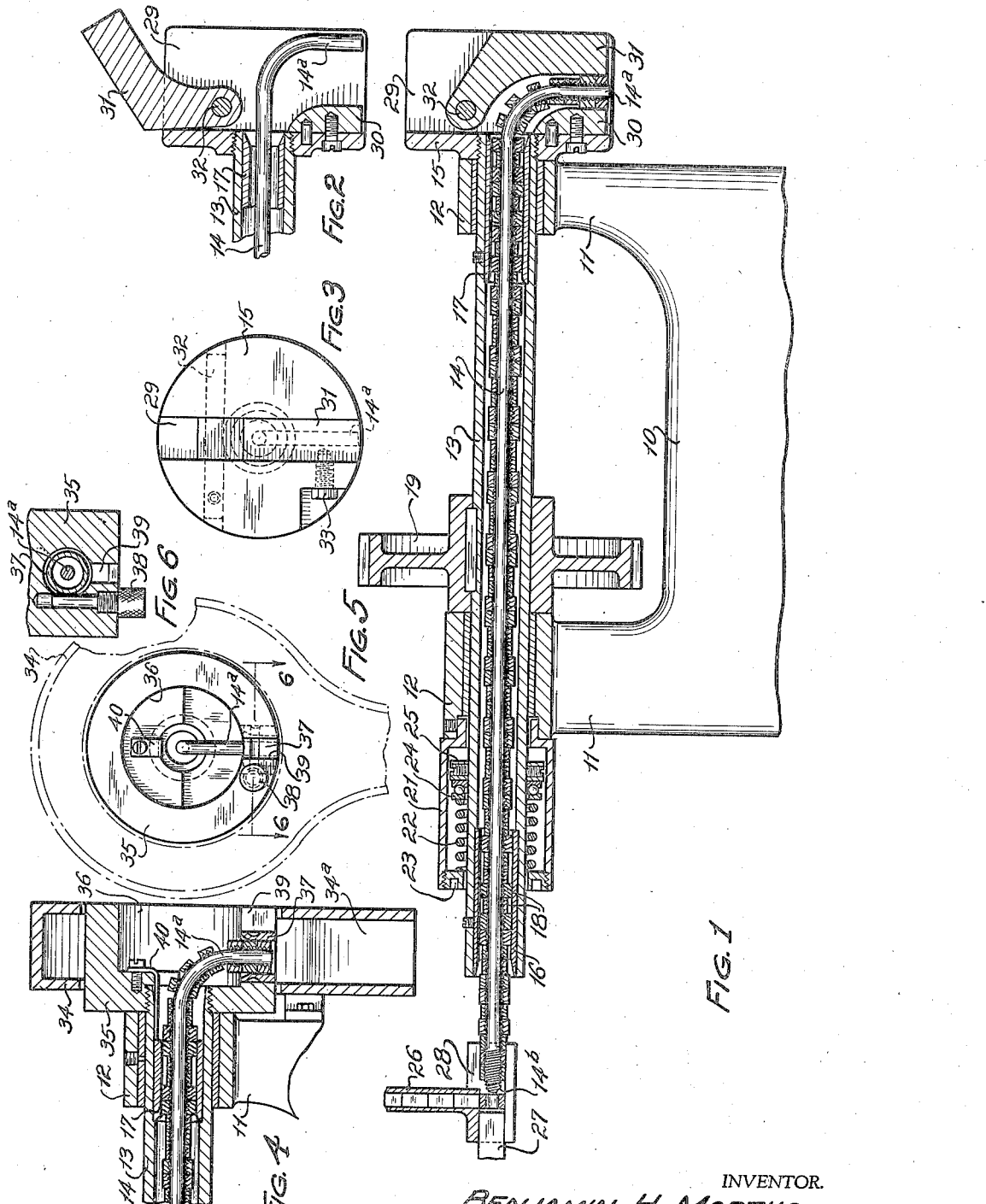
INVENTOR.
BENJAMIN H. MORTUS
BY
*Kwis, Hudson & Kent*
ATTORNEYS.

Patented Mar. 15, 1938

2,111,295

UNITED STATES PATENT OFFICE 2,111,295

NUT TAPPING MACHINE

Benjamin H. Mortus, Shaker Heights, Ohio, assignor to The National Screw & Manufacturing Company, Cleveland, Ohio, a corporation of Ohio Application April 25, 1936, Serial No. 76,457

7 Claims. (Cl. 10—129)

This invention relates to a nut tapping machine of the well known bent tap type.

In one commonly employed form of tapping machine of this type, the bent tap is supported by a chuck secured to one end of a rotating spindle, the chuck having a laterally curved passageway for the bent part of the tap and a tubular extension through which the straight part of the tap shank extends, the tapped nuts of course supporting the tap in the chuck and moving lengthwise thereof and finally being discharged from the bent end. In these machines, although the nuts that surround and move lengthwise of the tap not only support the tap but are supposed to hold it more or less centrally with respect to the axis of rotation of the spindle and chuck, the tap is of necessity rather short, and the manner in which it is supported inevitably causes wobbling of the forward free end of the tap where the tapping is done and onto which the nut blanks are pushed, with the result that the tap has a reaming or counterboring effect on the nut blanks beyond the tolerance permitted by accuracy required at the present time. In another type of machine, the spindle is stationary and the nuts are rotated during the tapping operation, but the spindle and the tap are supported as in the instance first mentioned, and the same objections apply to this form as well as to the form first referred to.

The principal object of the present invention is to provide a nut tapper wherein a much longer tap may be employed than heretofore and to so support it that the tap will be held in a more central position and the counterboring action heretofore prevalent will be minimized or eliminated entirely.

A further object is to provide a nut tapper wherein the removal and replacement of a tap can be accomplished quickly and easily.

A still further object is to provide a nut tapper wherein a head or chuck which receives the bent end of the tap and which constitutes the driving element of the tap may be considerably reduced in diameter.

The above and other objects are attained by the present invention which may be here briefly summarized as consisting in certain novel combinations and arrangements of parts and details of construction which will be described in the specification and set forth in the appended claims.

In the accompanying sheet of drawings wherein I have illustrated the preferred embodiment of the invention, Fig. 1 is a view partly in elevation and partly in vertical section showing the principal part of the tapper or so much thereof as involves the present invention;

Fig. 2 is a fragmentary sectional view of the head end of the driving spindle showing a latch swung to inoperative position to illustrate the manner in which the tap may be removed;

Fig. 3 is an end view of the driving head;

Fig. 4 is a fragmentary sectional view showing a modified form of chuck with a guard around the same to receive the threaded nuts discharged from the end of the tap;

Fig. 5 is an end view of the chuck shown in Fig. 4; and

Fig. 6 is a detail sectional view substantially along the line 6—6 of Fig. 5.

Referring now to the drawing, 10 represents a portion of the bed or frame of the machine, the same being provided with two upstanding spaced bearing arms 11 at the top of which are bearing bosses 12 equipped with bushings in which is journaled a hollow spindle 13 through which is adapted to extend the bent tap 14. The spindle projects slightly beyond the rear bearing boss 12 and the same distance beyond the forward boss 12. It will be observed that I employ a tap having a relatively long straight shank provided at its rear end with a bent portion 14a and at its forward end with the tapping portion 14b located a suitable distance beyond the forward end of the spindle. The rear end of the hollow spindle 13 has threaded or otherwise secured thereto an annular head 15 provided with a laterally curved passageway extending from the end of the spindle to the periphery of the head to accommodate the bent end 14a of the tap and thus drive or rotate the latter with the spindle. The construction of the head will be explained presently.

Secured in both the forward and the rear ends of the hollow spindle 13 are spindle tubes 16 and 17, and it is by means of these tubes that the tap is supported centrally of the spindle through the engagement therewith by the tapped nuts 18 which are strung along the shank from the tapping end 14b to the free end of the bent part 14a of the tap substantially as shown. These tubes 16 and 17 are located a sufficient distance apart so that, by the supporting action of the threaded nuts on the shank inside of the tubes during the operation of the machine, the rotating tap is held in its central position within the hollow spindle and the wobbling action heretofore present at the tapping end is substantially entirely avoided. Between the tubes the nuts do not have any supporting action, and while the two fairly widely spaced tubes at opposite ends of the spindle are preferred, since they, with the cooperation of the nuts passing along the shank inside the tubes, are sufficient to hold the tap in its central position, more than two tubes spaced lengthwise of the spindle may be employed, or, if desired, the spindle may have a continuous tap supporting tube extending for its full length. However, as stated above, two spaced tubes at the opposite ends of the spindle give sufficient holding or centralizing action on the tap and the free space between the tubes reduces friction of the nuts passing lengthwise of the tap and spindle and thereby facilitates their movement along the same. The spindle tubes 16 and 17 are held in place in the hollow spindle 13 by set-screws or other suitable means. When the size of the nuts being tapped is changed, these tubes are removed and replaced with tubes having a different size bore—either larger or smaller as the case may be—so as to accommodate the size of nut being tapped.

The rotative force is applied to the spindle 13 between the bearing arms 11 by means of a pulley or gear, in this instance a gear 19, which is keyed to the spindle next to and just inside the forward arm 11. While the driving gear is here secured to the spindle between the bearing arms 11 and that arrangement is preferred, nevertheless this particular location of the driving member with reference to the arms 11 is not essential, and, in some instances, it may be secured to the spindle outside the bearing arms either in front of the forward arm 11 or behind the rear arm 11.

A spring is preferably utilized to exert a backward or inward thrust on the spindle, the same being employed in the following manner: A spring housing 21 is secured to the bearing boss 12 of the forward arm 11 and projects forwardly for a distance along that portion of the spindle which projects beyond the forward bearing boss. This housing encloses a coil spring 22 which at its forward end engages a nut 23 screwed into the forward end of the housing and free of the spindle and at its rear end engages a thrust bearing 24 the rear or inner race of which engages a collar 25 which is secured to the spindle. The thrust of the spring is therefore transmitted in an inward direction through the bearing 24 to the collar 25 and therefore to the hollow spindle. The spring serves as a neutralizer for the weight of the spindle and tap when loaded with nuts and substantially overcomes any tendency for the spindle to move forwardly but will allow a slight float as the nut blank is moved onto the tapping end of the tap, as is desired in practice. As here shown, the spindle is horizontal but that is not essential as it may be mounted in inclined position with the forward end lower than the rear end.

The nut blanks are supplied from a hopper (not shown) and pass down a chute 26 the lower end of which is adjacent the forward end 14b of the tap. Suitable means, such as a reciprocating pusher 27, moves the nut blanks one at a time onto the tap. They pass along a suitable holder 28 which holds them against rotation during the tapping operation. The pusher 27 will be operated in the well known manner from a part of the machine in predetermined timed relation with the rotation of the spindle.

The head 15 is a cylindrical member provided with a deep slot 29 formed diametrically across the same and the laterally curved passageway for the bent end of the tap is formed between the parallel side walls of the slot 29 and two curved members 30 and 31, the former being a fixed insert and the latter a pivoted latch mounted on a pin 32 and normally held in the position shown in Fig. 1 by a screw 33 (see Fig. 3) or equivalent means. This construction makes the removal and replacement of the tap with a new one a relatively simple matter, for it is only necessary to remove the holding means, such as the screw 33, for the latch, and to swing the latter from the normal operating position to the position shown in Fig. 2, whereupon the tap with the nuts strung on it can be slid rearwardly out of the spindle.

It will be understood, of course, that the tapped nuts slide one at a time off the bent end of the tap from the head 29, and, inasmuch as the head rotates, it is desirable that the head be surrounded by a suitable stationary guard omitted from Fig. 1 but one form of which is shown at 34 in Figs. 4 and 5, this guard having a channel portion surrounding the head and a discharge chute 34a from which the nuts pass by gravity into a suitable receptacle.

The fact that the straight shank of the tap is centralized in the spindle and supported therein by the nuts on the shank and by the widely spaced spindle tubes 16 and 17 (or by a long continuous tube) affords ample bearing for the tap on the straight portion alone and the bent portion of the tap and the curved passageway in the head are not required for supporting and holding the tap in a central position with reference to the axis of the spindle. Accordingly, the head is utilized for driving purposes only and can be made much smaller than heretofore.

With the construction of the head illustrated in Figs. 1, 2, and 3, the insert 30 and the latch 31 are replaced with similar parts but of slightly different shape or size when the size of the nuts being tapped is changed so as to provide a suitable shape and size of curved passageway for the bent end of the tap and for the particular size nuts being tapped.

In Figs. 4, 5, and 6 I have shown a head which has the advantages of the head first described but is somewhat simpler in construction and more easily adapted for change in the size of the nuts. This head, which is designated 35, is screwed onto the end of the spindle, as in the first instance, or otherwise secured thereto. On the rear side of the head there is an annular cavity or recess 36 into which the bent end of the tap extends. The peripheral or annular part of the head is provided with a radial opening and fitted into this opening is a bushing 37 which receives the discharge end of the tap, the bore of this bushing being of a size to accommodate the tapped nuts passing off the end of the tap. The bore of the bushing has its inner end counterbored or beveled to facilitate the entrance of the nuts into the bore as they pass along the discharge end of the tap. This bushing is removably held in place by any suitable means, such as a head screw 38 which, as best shown in Fig. 6, has an unthreaded shank portion which fits into an annular groove on the surface of the bushing 37 and thus holds it in place, but when the screw is removed, the bushing 37 can be slipped out of place either inwardly or outwardly. Extending from the bore or hole which receives the bushing 37 to the outer or rear face of the head is a slot 39 which has a width slightly greater than the diameter of the tap. As a result of this construction, when it is desired to remove the tap, it is only necessary to remove the bushing 37 and a few of the tapped nuts from the extreme end portion of the tap and then withdraw the tap in an endwise direction from the rear end of the spindle, the discharge end of the tap then moving through the slot 39. When the size of the nut being tapped is changed, the bushing is replaced with one having a different bore or opening.

In Fig. 4 the rear spindle tube 17 is shown held in place by an L-shaped bushing-holder 40 which is secured in the recess 36 of the head and extends forwardly into the spindle and engages the rear end of the spindle tube. However, any other suitable means, such as a set-screw, may be utilized for this purpose.

It will be seen from the above that the objects stated at the beginning of the specification are effectively attained by the present construction. While I have shown the preferred construction, I do not wish to be confined thereto as changes may be made without departing from the spirit of the invention as defined in the appended claims.

Having thus described my invention, I claim:

1. In a nut tapper, a frame or bed having a pair of spaced bearings, a hollow spindle journaled in said bearings for rotation and limited axial shifting and having a head outside one of the bearings with a laterally extending passageway, a tap having a bent portion in said head and a straight portion extending throughout the length of said spindle beyond the other bearing and provided at its free forward end with a tapping portion, and spring means arranged to yieldingly resist forward axial shifting of the spindle.

2. In a nut tapper, a frame or bed having a pair of spaced bearing arms, a hollow spindle journaled therein for rotation and limited axial shifting and extending between and beyond the two arms, the rear end of the spindle having a head with a lateral passageway therein, a tap having a bent portion in said passageway and a straight shank extending through said spindle, a driving member for the spindle secured thereto between said bearing arms, a hollow casing carried by one of said arms and extending around the spindle and axially thereof, and a spring in the casing adapted to yieldingly resist axial shifting of the spindle in one direction.

3. In a nut tapper, a rotatable hollow spindle, a driving member secured to the spindle, a head at the rear end of the spindle having a recess with which the opening of the spindle communicates and which extends to the rear end of the head, a tap extending through the spindle and having at its front end a tapping portion and at its rear end a bent portion extending into the recess of said head, and a member pivoted on said head for movement in the recess thereof and adapted when swung to its normal position to provide a passageway to receive the discharge end of the tap and the nuts traveling along the latter, said member being adapted to be swung to another relative position to permit the tap to be moved rearwardly in an endwise direction for removal thereof from the spindle and the head.

4. In a nut tapper, a rotatable hollow spindle, a driving member secured to the spindle, a head at the rear end of the spindle having a recess with which the opening of the spindle communicates and which extends to the rear end of the head, a tap extending through the spindle and having at its front end a tapping portion and at its rear end a bent portion extending into the recess of said head, a pair of members in the recess of the head cooperating to form a passageway to receive the discharge end of the tap and the nuts traveling along the latter, one of said members being relatively stationary and the other being pivoted to swing from its normal cooperating position to a second position permitting the tap to be moved rearwardly in an endwise direction for removal from the spindle and the head.

5. In a nut tapper, a rotatable hollow spindle, a driving member secured to the spindle, a head connected with the rear end of the spindle and having an annular portion defining a recess with which the opening of the spindle communicates, said annular portion having therein a radial opening which communicates with said recess and which extends through the rear face of the head, a bushing mounted in said radial opening, and a tap extending through the spindle and having at its front end a tapping portion and at its discharge end a bent portion extending into the recess of the head and into the bushing, said bushing being removable to permit the tap to be moved rearwardly in an endwise direction for removal thereof from the spindle and head.

6. In a nut tapper, a rotatable hollow spindle, a driving member secured to the spindle, a head connected with the rear end of the spindle and having a substantially central recess with which the opening of the spindle communicates, a tap extending through the spindle and having at its front end a tapping portion and at its rear end a bent portion extending into the recess of the head, said head having a radial bore communicating with said recess and a radial slot extending from the bore through the rear face of the head, and a bushing in said bore and into which the discharge end of said bent portion extends, said bushing being removable to permit the tap to be moved rearwardly in an endwise direction for removal thereof from the spindle and head with said bent portion passing through said slot.

7. In a nut tapper, a frame, a hollow spindle journaled on said frame for rotation and limited axial shifting, the rear end of the spindle having a head with a lateral passageway therein, a tap having a bent portion in said passageway and a straight shank extending through said spindle, and spring means arranged to act on the spindle so as to resist axial shifting of the same in one direction.

BENJAMIN H. MORTUS.